May 25, 1937.  W. A. SMITH  2,081,512
APPARATUS FOR PREPARING FOOD SUBSTANCES
Filed May 21, 1935  3 Sheets-Sheet 1
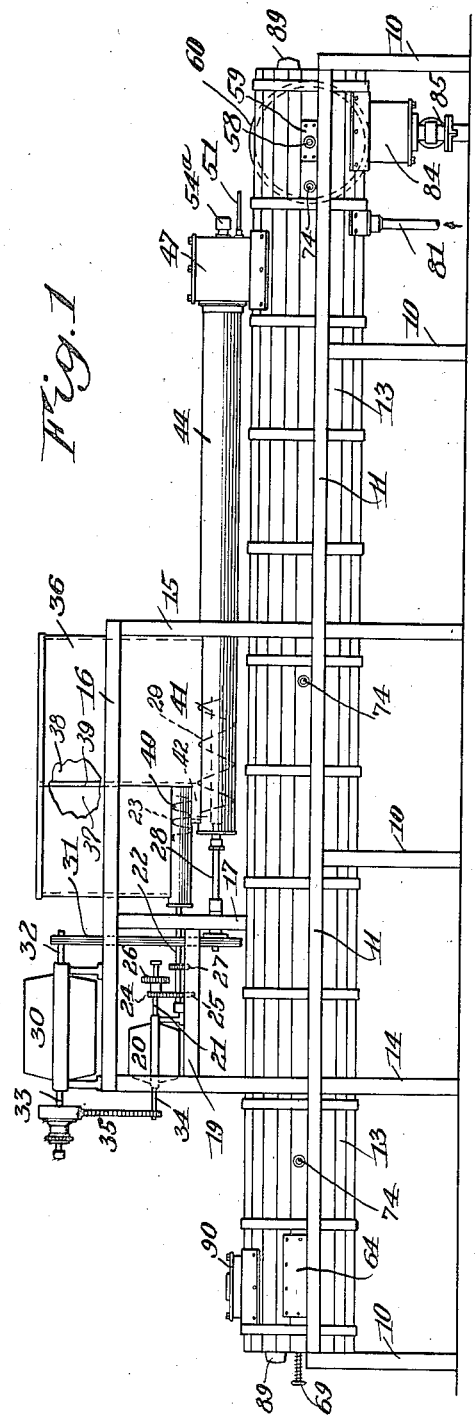
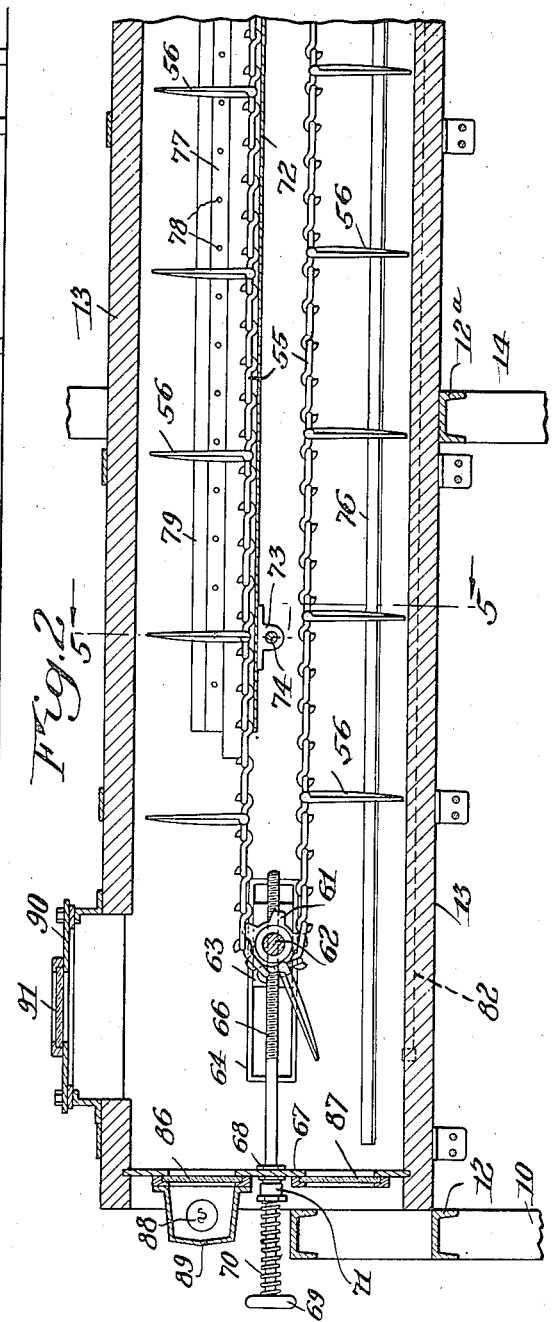
INVENTOR
William A. Smith
BY Edward H. Cumpston
his ATTORNEY May 25, 1937. W. A. SMITH 2,081,512
APPARATUS FOR PREPARING FOOD SUBSTANCES
Filed May 21, 1935 3 Sheets-Sheet 2
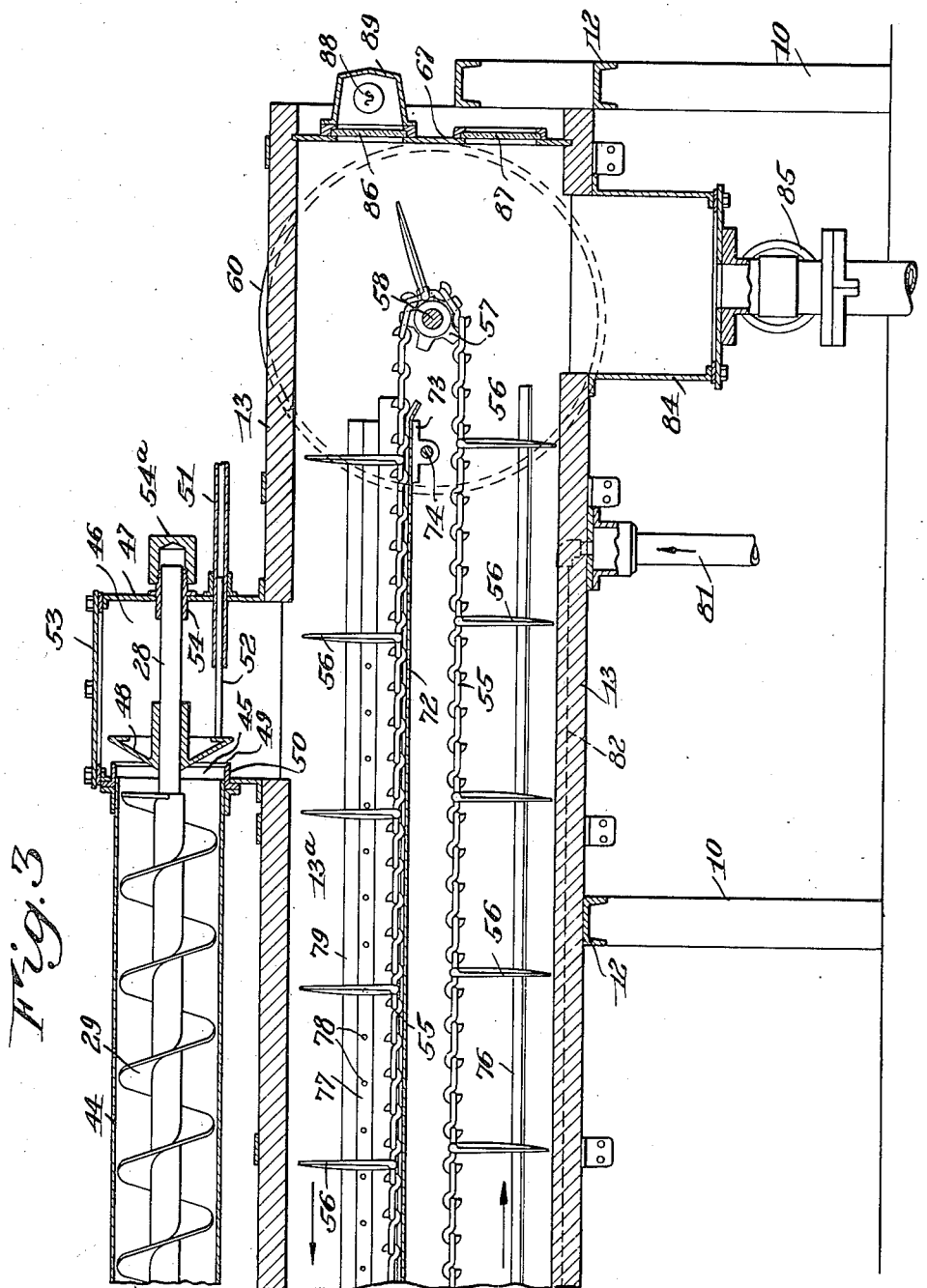
INVENTOR
William A. Smith
BY Edward H. Cumpston
his ATTORNEY INVENTOR
William A. Smith
BY Edward H. Cumpston
his ATTORNEY Patented May 25, 1937

2,081,512

UNITED STATES PATENT OFFICE 2,081,512

APPARATUS FOR PREPARING FOOD SUBSTANCES

William A. Smith, Lyndonville, N. Y.

Application May 21, 1935, Serial No. 22,590

19 Claims. (Cl. 53—18)

One object of the invention is to provide a simple, practical, and efficient machine for heating, cooking, or otherwise treating food substances or compounds by a continuous method to produce the desired product in an expeditious and economical manner.

A further object of the invention is to provide an improved machine for proportioning, mixing, and heating or cooking the ingredients of products such, for example, as fruit sauces, jams, and the like and one which is capable of being controlled to yield uniform and pleasing characteristics of flavor, consistency, color, and the like.

A further object of the invention is to provide an improved machine of the class described in which the material is moved lengthwise of an elongated heating or cooking container and in opposite directions along different paths while mixing the ingredients and subjecting the mixture to the action of steam or other heating medium within the container whereby to greatly reduce the overall length of a machine of this class having a given capacity.

A further object of the invention is to provide improved means for controlling or regulating the discharge of the material from the mixing to the heating or cooking chamber.

A further object of the invention is to provide a machine of this type which is automatic in operation and which will rapidly and continuously produce a sanitary compound or product of uniformly desirable quality.

A further object of the invention is to provide in combination with a heating or cooking chamber for the mixture, improved means for conveying the mixture through the chamber and for heating it while moving therein, whereby to reduce the time and cost of operating the machine.

To these and other ends the invention resides in certain improvements and combinations of parts, all as will be hereinafter more fully described, the novel features being pointed out in the claims at the end of the specification.

In the drawings:

Fig. 1 is a side elevation of a machine embodying the invention;

Fig. 2 is a fragmentary sectional elevation taken longitudinally through one end of a stationary drum forming the cooking chamber and drawn to an enlarged scale;

Fig. 3 is a longitudinal section through the opposite end of the drum and a part of the propeller for delivering the mixture to the drum;

The same reference numerals throughout the several views indicate the same parts.

Figure 4:
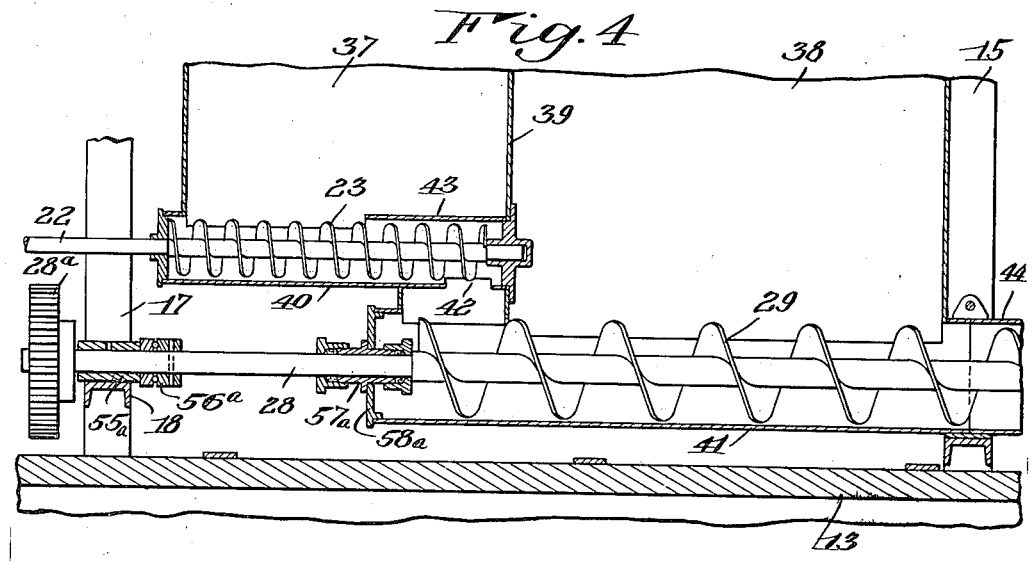
Fig. 4 is a fragmentary sectional elevation through the fruit and sugar receiving chambers.

Referring to the drawings, there is shown in Figs. 1 to 3, inclusive, spaced pairs of posts 10 connected by horizontally extending beams 11 and transversely extending members 12 for supporting the stationary drum 13 which affords a heating or cooking chamber 13a within which the mixture is treated as described hereinafter.

Additional supporting means for the drum includes the upright frame members 14 and 15 which are disposed in pairs on opposite sides of the drum and which have transverse connecting members 12a extending beneath and in engagement with the drum as shown in Fig. 2. The upper ends of the frame members 14 and 15 are connected at each side of the drum by a horizontally extending beam 16. The frame members 14 and 15 are also connected by transverse bracing members above the drum, not shown. A pair of frame members 17 are extended upwardly from the drum and may be connected with the horizontal beams 16 in any suitable manner, said members being connected one with another by one or more transverse members 18, Fig. 4.

Additional frame members 19, only one of which is shown, are horizontally disposed between and suitably connected with the frame members 14 and 17 to constitute supporting means for the housing 20 containing the change speed gears for controlling the speed of the operating shafts 21 and 22 for the sugar feeding propeller 23 shown in Fig. 4. The shafts 21 and 22 are preferably provided with two sets of gears, one set being shown at 24 and 25, and another at 26 and 27, said sets of gears being proportioned to afford different speeds for the shaft 22 whereby to vary the speed of the sugar feeding propeller 23 in proportion to that of the drive shaft 28 for the larger propeller 29 for delivering the mixture to the cooking chamber 13a of the drum 13 as described hereinafter. The two sets of gears interposed between the shafts 21 and 22 are, of course, provided with suitable means, not shown, for operatively connecting either set with the propeller shaft 22.

The housing 30 containing the change speed gearing for controlling the speed of the mixing propeller 29 is suitably supported on cross members, not shown, interposed between the longitudinally extending frame members 16, Fig. 1. The propeller shaft 28 has a gear 28a thereon driven by a belt 31 through engagement with a gear on the shaft 32, the latter extending from and being driven by the change speed gearing of the housing 30, said gearing being driven by a main operating shaft 33 which is adapted for operation by any suitable power driven means, not shown.

The shaft 34 for driving the change speed gearing of the housing 20 is connected with and driven by the shaft 33 as, for example, by a gear train, indicated generally at 35 and designed to operate the shaft 34 at the desired speed.

A container 36 is suitably connected with and supported by a portion of the framework previously described, which includes the upright and horizontal frame members 15 and 16, respectively, and other parts, not shown. The container comprises oppositely disposed ingredient receiving receptacles 37 and 38 separated by a partition 39 as shown in Fig. 4. The receptacles 37 and 38 are adapted, respectively, to receive the sugar and the fruit and if preferred each may be in the form of a hopper to better facilitate the discharge of materials to the propellers for properly mixing and distributing the ingredients. The receptacle 37 has formed in its bottom a trough or channel 40 within which the propeller 28 is adapted to operate, the receptacle 38 also having a trough or channel 41 at the bottom thereof within which the larger or mixing propeller 29 operates, as shown in Fig. 4. The trough 41 and propeller therein are extended beneath one end of the trough 40 which has an opening 42 for the discharge of the sugar or other ingredient of the receptacle 37 to the propeller 29. The propeller 28 has at the discharge end thereof an overlying cover plate 43 which serves to prevent the ingredients of the receptacle 37 from falling directly through the outlet 42 to the propeller 29.

The trough 41 has a rearward extension 44 of cylindrical construction, within which the propeller 29 extends, said extension having an outlet 45 communicating with the chamber 46 of the housing 47. The mixture discharged by the propeller into said chamber is free to descend therethrough to the heating or cooking drum 13 during operation of the machine.

Disposed within the chamber is a valve 48 for controlling the mixture outlet 45, the valve being slidably mounted on the propeller shaft 28 and adapted when in closed position to engage the valve seat 49 on the ring-shaped supporting member 50 carried by the housing 47 and forming a support for the cylinder 44 within which the propeller 29 operates.

The discharge of the mixture to the cooking chamber 13a of the drum 13 is controlled by the valve which is pressure operated by suitable means provided for the purpose. Said means may for example comprise a cylinder 51 having a pressure operated piston 52 therein connected with the valve and effective to balance it upon the propeller shaft under a predetermined pressure exerted by the mixture discharging through the opening 45 or to move it toward closed position when the pressure of the mixture becomes less than that exerted on the piston by the medium supplied to the cylinder. The valve will of course be closed by the piston upon discontinuing operation of the propeller 29. Any suitable liquid or gas may be delivered to the cylinder for moving the valve, preferably steam, the cylinder being connected with any suitable supply source such as one of the pipes for supplying steam to the cooking chamber 13a.

Any suitable means, not shown, may be provided for regulating the pressure of steam or other gas admitted to the cylinder, depending on the pressure or rate of flow of the mixture through the valve controlled opening 45, it being understood that the operation of the valve to increase or decrease the size of the opening will be automatic. In other words, the propeller 29 may be driven at different speeds to vary the flow of the mixture through the valve outlet, and in such cases the position of the valve will vary with respect to the outlet.

It will be understood that the pressure of the mixture on the valve can be determined for different operating conditions and that the pressure of the steam or other gas within the cylinder may be correspondingly regulated to control the position of the valve with respect to the outlet. By tapering or making the valve cone-shaped as shown, it will upon movement outwardly or inwardly gradually increase or decrease the size of the opening through which the mixture is discharged. The valve is made readily accessible for cleaning and other purposes by removing the cover plate 53 of the housing 47.

The propeller shaft 28 is supported at its rear end by a bearing 54 mounted on the outer wall of the housing 47 as shown in Fig. 3, the bearing having a cap 54a screwed thereon to form a seal for preventing escape of the steam therethrough supplied to the cooking chamber 13a. The opposite end of the shaft is supported by a bearing 55a mounted on the cross member 18 extending between the uprights 17, as shown in Fig. 4. A thrust bearing 56a is positioned on the shaft at the inner end of the bearing 15 to prevent longitudinal movement of the shaft in one direction. The shaft is also supported by a bearing 57a mounted in the end wall 58a of the trough 41.

It will be understood that the propeller 28 within the receptacle 37 will automatically effect a continuous flow of the ingredients placed therein to the trough 41 at the rate determined upon and that the propeller 29 will thoroughly mix the ingredients of the two receptacles during advancement thereof to the heating or cooking drum 13. By thus combining the fruit or apple cuttings and the sugar or other ingredients and slowly propelling the same through the trough 41 and cylinder 44, the fruit pieces are advanced without being broken up and become thoroughly coated with a film of sugar through the constant agitation of the ingredients by the blades of the propeller 29.

Suitable means is provided for moving the mixture through the heating or cooking chamber 13a at the desired rate of speed, which is capable of being controlled to vary the rate of discharge as may be required. A considerably increased output of the compound for a cooking chamber of given proportions is afforded by the present method as compared to other methods heretofore employed for similar purposes. The preferred method is to advance the mixture or food ingredients in one direction within the cooking receptacle by suitable means and to employ said means for moving the mixture in an opposite direction therein. With this method the overall length of the receptacle is greatly reduced so that a considerable saving in the cost of constructing and operating the unit is afforded. The present means for feeding the mixture or food ingredients through the cooking chamber comprises a continuous conveyor embodying a sprocket chain 55 having spaced impelling blades or members 56 suitably connected therewith for advancement thereby. The chain is driven by a sprocket 57 on a drive shaft 58, the opposite ends of which are journaled in bearings 59 supported by the side rails 11 of the framework as shown in Fig. 1, the shaft having an operating pulley 60 which may be driven at the desired rate of speed by any suitable means, not shown.

The chain also engages a sprocket 61 loosely mounted on a transverse shaft 62 having its opposite ends secured in bearings 63 slidably mounted in guides 64 suitably supported upon the side walls of the stationary drum 13. Means is provided for adjusting the shaft 63 longitudinally of the drum by sliding its bearings in the guides 64, whereby to properly tension or take up undue slack in the conveyor chain 55. This means comprises a pair of rods 66 extending through and threadedly engaging the shaft, the outer ends of the rods being extended through one of the end walls 67 of the drum and rotatable in suitable bearings 68 supported by said wall. Each rod has an operating knob 69 thereon, a spring 70 being positioned on the rod between the knob and a stuffing box 71 through which the rod extends, the stuffing box being connected with the bearing 68 and serving to prevent escape of the steam from the cooking chamber around the rod. The rods are adjustable to tension the springs whereby to afford the proper resistance for obtaining the desired tension of the sprocket chain 55.

The mixture forced by the propeller 29 past the valve 48 into the chamber 46 is discharged by gravity to a table 72 extending longitudinally within the drum, the receiving end of the table extending somewhat in rear of the chamber 46 and the opposite end terminating short of the transverse sprocket shaft 62 to allow the mixture advanced by the conveyor blades 56 to discharge downwardly to the bottom of the drum before reaching said shaft.

The table is supported adjacent each of its ends by a pair of brackets 73 suitably secured on a transverse bar 74, the ends of which extend through and are supported by the side walls of the drum. The bar in addition to supporting said brackets also serves to brace and tie the side walls of the drum together.

Disposed on the opposite edges of the table are the angle bars 75 which serve to slightly-space the conveyor blades 56 from the table and to support them during advancement above the table. The vertical flanges of the angle bars lie against the upstanding portions of the bracket 73, as shown in Fig. 5, the angle bars being secured upon the brackets by any suitable means, not shown, for cooperation with the table to afford a channel or channeled guideway for the conveyor and the material advanced by the latter.

Figure 5:
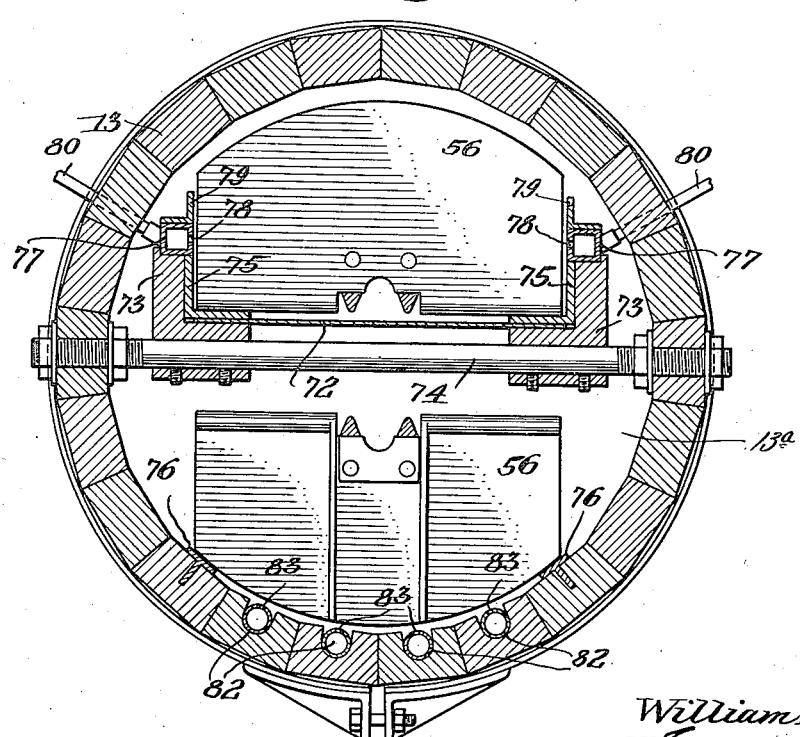
Fig. 5 is a transverse sectional elevation through the drum drawn to an enlarged scale and taken approximately on line 5—5 of Fig. 2.

The blades are also held in slightly spaced relation with respect to the bottom of the drum while passing over the same, preferably by means of a pair of rails or bearing strips 76 which may be in the form of T-bars, supported upon the wall of the drum as shown in Fig. 5 beneath the ends of the blades.

The medium for heating or cooking the food within the drum preferably comprises steam supplied from any suitable source, under the desired pressure, which may be regulated or controlled by any suitable means, not shown. The steam is discharged directly into engagement with the mixture while it is being advanced upon the table by the conveyor. To this end steam pipes 77 are extended longitudinally of the drum on opposite sides of the conveyor and are preferably supported upon the brackets 73 and the vertical flanges of the angle bars 75 as shown in Fig. 5. The pipes 77 may be of rectangular construction as shown and have their inner faces substantially flush with the inner faces of the angle bars for cooperation therewith to afford guide means for the blades of the conveyor and to increase the depth of the channel within which the conveyor operates. The steam pipes are provided with a series of apertures 78 through which the steam escapes in the form of jets, preferably below the level of the mixture advanced by the conveyor blades through the channeled guideway. In this way the steam is permitted to penetrate into and to become intimately mixed with the ingredients during the movement thereof by the upper flight of the conveyor. Angle bars 79 are superimposed upon the steam pipes 77 as shown in Fig. 5 to form additional guide means for the blades and to further increase the depth of the channel through which the ingredients are advanced by the upper flight of the conveyor.

It will be understood that the size, location, and number of the steam outlet openings 78 will be such as to insure complete and thorough mixing of the steam particles with the ingredients advanced through the channel by the conveyor. One or more steam supply conduits 80 are connected with the pipes 77 and may be extended to any suitable source of supply, not shown.

The ingredients discharged by the upper flight of the conveyor from the trough or channel in which it operates will descend to the bottom of the drum where they are subjected to the action of an additional supply of steam admitted through one or more supply pipes 81, leading to the horizontally disposed pipes 82 located in the bottom wall of the drum as shown in Fig. 5. These pipes are each provided with a series of openings 83 for discharging jets of steam upwardly into the mixture while it is being returned through the bottom of the drum by the lower flight of the conveyor moving therein.

As previously stated, the ingredients are thoroughly mixed within and while being fed through the trough 41 and cylinder 44 by the propeller 29, which serves to deliver the mixture through the valve-controlled cylinder outlet 49 into the chamber 46 for discharge by gravity to the channel within the cooking chamber 13a.

The continuous feeding of the ingredients through the upper and lower portions of the cooking chamber and the constant subjection of the mixture to the action of steam throughout its course of movement within the chamber insures a maximum degree of efficiency in the handling and treatment of the ingredients, with a considerable saving in time and with a minimum cost of operation.

The mixture is discharged by the lower flight of the conveyor into a receptacle 84 from which it is drawn off through suitable piping 85 for screening or other disposition.

The end walls 67 of the drum are provided with upper and lower transparencies 86 and 87, respectively, the upper transparency having electric light bulbs 88 disposed in front of the same for illuminating the interior of the drum, the lights being enclosed in housings 89 suitably secured upon said walls. The inner faces of the end walls of the housing are preferably provided with suitable light reflecting means, not shown, whereby to insure more effective illumination of the interior of the drum. The transparencies 87 constitute windows through which to view the contents of the drum from time to time.

A door or closure 90 is provided at one end of the drum to afford easy access thereto for inspection and cleaning purposes, the door being preferably provided with a window 91. The cover 53 of the receptacle 47 may be removed to afford access to the latter and to the drum for inspection and cleaning purposes when desired. The drum may be formed of any suitable material and constructed in any preferred or desired manner.

One of the important features of the invention is to construct a machine of the class described of a given capacity in such a manner as to greatly reduce its overall length whereby to make it possible to install and operate the machine in a comparatively limited space. This result is accomplished by moving the material to be treated longitudinally of the machine in different directions and in paths disposed one above another while mixing and processing the ingredients as distinguished from the previous method of moving the material in one direction only for the full length of the machine. For example with the present method, as previously stated, the ingredients during the mixing operation are moved within the conduits 41, 44 longitudinally of the container 13 and then discharged into one end thereof. The mixture is then moved at one level longitudinally within the container substantially from one end thereof to another after which it is returned at a different level to the inlet end of the container. It will be seen therefore that with this method of treating the material that the overall length of the container can be reduced to considerably less than half what it would be in a machine of the same capacity in which the material has to be moved in one direction only for the full length of the heating chamber as in previous methods.

I claim:

1. An apparatus for treating food substances, comprising an elongated container having an inlet for the material adjacent one end thereof, means overlying the container and extending longitudinally thereof for a considerable portion of its length and operating to advance the material to said inlet and to mix it during advancement thereof, means extending longitudinally within the container for the greater portion of its length adapted to receive the material discharged thereto through said inlet, a valve for controlling said inlet adapted to be opened by a predetermined pressure of the material thereon, means for automatically closing the valve upon a reduction in the pressure of the material below that required to open the valve, a continuous conveyor operable within the container to move the material on said means from the receiving end thereof and to discharge it therefrom at its opposite end, said conveyor also operating to return the discharged material to the inlet end of the container, means for directing a plurality of jets of steam into the material during movement thereof on and beneath said material receiving means, and tensioning means for the conveyor operable from the exterior of the container.

2. An apparatus for treating food substances, comprising an elongated container having an inlet and an outlet for the material adjacent one end thereof, a channel extending longitudinally within the container above the bottom thereof and adapted to receive the material discharged to the container through said inlet, a continuous conveyor operable through the channel to advance the material therein and to discharge it therefrom comprising a sprocket chain disposed centrally of the channel and having blades for impelling the material extending laterally from the chain at opposite sides thereof, said conveyor operating to return the discharged material along the bottom of the container substantially to said outlet for discharge therethrough, and means for directing jets of steam into the material during movement thereof within the channel and along the bottom of the container.

3. An apparatus for treating food substances, comprising an elongated container having inlet and outlet openings for the material adjacent one end thereof, a channel extending longitudinally within the container for the greater portion of its length and adapted to receive the material delivered to the container through said inlet opening, a continuous conveyor belt operable within the container through the channel, said conveyor including a sprocket chain disposed centrally of the channel and having spaced elements extending laterally from the chain on opposite sides thereof and operating to move the material through and to discharge it from the channel, said spaced elements also operating to move the discharged material beneath the channel and to deliver it to said outlet opening, means associated with the channel for directing jets of steam into the material moving therethrough, means for directing jets of steam into the material during movement thereof beneath the channel, and means for operating the conveyor belt.

4. An apparatus for treating food substances, comprising an elongated container having inlet and outlet openings for the material adjacent one end thereof, a channel extending longitudinally within the container for the greater portion of its length and adapted to receive the material delivered to the container through said inlet opening, said channel having a plurality of its walls formed in part of conduits provided with apertures for discharging jets of steam into the material within the channel, means operable to move the material through and to discharge it from the channel, said means operating to return the discharged material through the container to said outlet opening, and means for directing jets of steam into the material during movement thereof beneath the channel to said outlet opening.

5. An apparatus for treating food substances, comprising a container having an inlet for the material, means overlying and extending longitudinally of the container for feeding the material to the inlet, a valve interposed between the feeding means and said inlet, pressure producing means operatively associated with the valve, the latter being opened by a predetermined pressure of the material thereon during operation of the feeding means and closed when overcome by the pressure of said pressure means, means within the container for moving the material therein, and means for directing a heating medium into the material during movement thereof within the container.

6. An apparatus for treating food substances, comprising a container having an inlet for the material, means overlying and extending longitudinally of the container for a considerable portion of its length for feeding the material to the inlet, a valve interposed between the feeding means and said inlet, pressure producing means operatively associated with the valve, the latter being opened by a predetermined pressure of the material thereon during operation of the feeding means and closed when overcome by the pressure of said pressure means, means within the container for receiving the material discharged thereto through the inlet, said means being operable to move the material in different directions and at different levels within the container, and means for directing a heating medium into the material during movement thereof within the container.

7. An apparatus for treating food substances, comprising a container having an inlet for the material, a conduit overlying the container and having a propeller therein, for feeding the material to the inlet, an automatic pressure operated valve interposed between the discharge end of the conduit and said inlet, said valve being opened by a predetermined pressure of the material thereon during operation of the feeding means and being automatically closed when discontinuing operation of the feeding means, means within the container for moving the material therein, and means for directing a plurality of jets of steam into the material during movement thereof within the container.

8. An apparatus for treating food substances, comprising a container having an inlet for the material, means for feeding the material to the inlet, a valve interposed between the feeding means and said inlet, a cylinder having a piston therein operatively associated with the valve, the cylinder being adapted for the reception of fluid under pressure for operating the piston to close the valve, the latter being opened when pressure of the material thereon exceeds that of the pressure in the cylinder, means within the container for moving the material therein, and means for directing a heating medium into the material during movement thereof within the container.

9. An apparatus for treating food substances, comprising a container having an inlet for the material, feeding means for the material including a conduit having a propeller therein for discharging the material to said inlet, an operating shaft for the propeller, a valve for closing the conduit slidably mounted on said shaft, means for exerting pressure on the valve to move it to closed position, the valve being opened when the pressure of the material thereon exceeds that of said last mentioned means, means within the container for moving the material therein, and means for heating the material while moving it within the container.

10. An apparatus for treating food substances, comprising a container having an inlet for the material, means for feeding the material including a conduit having a propeller therein for discharging the material through said inlet, an operating shaft for the propeller, a valve for closing the conduit slidably mounted on said shaft, a cylinder having a piston therein operatively associated with the valve, the cylinder being adapted for the reception of a fluid under pressure for moving the piston to close the valve, the latter being opened when the pressure of the material thereon exceeds that of the fluid in the cylinder, means within the container for moving the material in different directions and at different levels therein, and means for heating the material while moving it within the container.

11. An apparatus for treating food substances, comprising an elongated container having inlet and outlet openings for the material adjacent one end thereof, guide means for the material extending longitudinally within the container from its inlet end substantially to its opposite end, a continuous conveyor within the container operable to advance the material on, discharge it from the guide means and return it beneath the latter to said outlet opening, transversely extending shafts within the container for supporting the conveyor, means operatively connecting one of the shafts with the conveyor, means supporting another of the shafts for movement longitudinally of the container to effect tensioning of the conveyor, and actuating means for the last mentioned shaft operable from the exterior of the container.

12. An apparatus for treating food substances, comprising an elongated container having inlet and outlet openings for the material adjacent one end thereof, guide means for the material extending longitudinally within the container from its inlet end substantially to its opposite end, a continuous conveyor within the container operable to advance the material on, discharge it from the guide means and return it beneath the latter to said outlet opening, transversely extending shafts within the container for supporting the conveyor, means operatively connecting one of the shafts with the conveyor, oppositely disposed guides secured on the container, one of said shafts having supporting parts at its ends slidably mounted on said guides, operating means for sliding said shaft to effect tensioning of the belt, said operating means threadedly engaging the shaft and extending through and being rotatably and slidably supported in an end wall of the container and operable from the exterior thereof, and means associated with said operating means for yieldingly resisting movement thereof in the direction of the shaft by the pull of the conveyor on the shaft.

13. An apparatus for preparing food compounds, comprising an elongated container having an inlet for the material adjacent one end thereof, means for receiving, mixing, and feeding the ingredients to said inlet, said means including a propeller having a surrounding tube overlying the container and extending longitudinally thereof for a considerable portion of its length, a valve interposed between the feeding means and said inlet, pressure actuated means for closing the valve, the latter being automatically opened by a predetermined pressure of the mixture thereon during operation of the feeding means, means within the container for receiving the mixture discharged thereto through the inlet, said means being operable to move the mixture within the container, and means for cooking the material while moving it within the container.

14. An apparatus for preparing food compounds, comprising an elongated container having an inlet and an outlet for the mixture adjacent one end thereof, a device overlying the container for mixing and moving the ingredients longitudinally thereof for a considerable portion of its length to said inlet for discharge therethrough, a valve for controlling said inlet opened by a predetermined pressure of the mixture thereon, means for automatically closing the valve upon a reduction in the pressure of the material thereon below that required to open the valve, means within the container for receiving the mixture discharged through said inlet, said means extending from the inlet end of the container substantially to its opposite end and forming a path for the material, mechanism operable within the container to move the material along said path from the inlet end of the container and to discharge it from said means adjacent the opposite end of the container, said mechanism operating to return the material beneath said means and to discharge it through said outlet, and means for heating the material during movement thereof by said mechanism.

15. An apparatus for treating food substances, comprising a container having an inlet for the material, means mounted exteriorly of the container for feeding the material to said inlet for discharge therethrough into the container, a valve mounted for movement between the feeding means and said inlet and opened by a predetermined pressure of the material thereon during operation of the feeding means, means for automatically closing the valve upon a reduction in the pressure of the material thereon below the pressure required to open the valve, means within the container for moving the material therein, and means for delivering a heating medium into heat conducting relation relative to the material during movement thereof by said last mentioned means.

16. An apparatus for treating food substances, comprising a container having an inlet for the material, a conduit having an outlet for discharging the material to the container through said inlet, feeding means operable to advance the material through the conduit to said inlet, valve means interposed between said inlet and the outlet of the conduit, said valve means being opened by the material within the conduit under a predetermined pressure thereof on the valve means, pressure producing means operating to automatically close the valve means upon a reduction in the pressure of the material thereon below the pressure required to open the valve means, means within the container for moving the material therein discharged thereto through said inlet, and means for heating the material while moving it within the container.

17. An apparatus for treating food substances, comprising a container having an inlet for the material, a conduit having an outlet for discharging the material to the inlet of the container, valve means for closing the outlet of the conduit, a propeller disposed within the conduit and operable to feed the material through the conduit under pressure sufficient to open the valve means, means for employing fluid under pressure to effect closing of the valve means upon a reduction in the pressure thereon by the material below the pressure required to open the valve means, means for moving the material within the container, and means for heating the material therein.

18. An apparatus for treating food substances, comprising a container having an inlet for the material, a conduit having an outlet for discharging the material to the inlet of the container, a propeller operable within the conduit to discharge the material through said outlet, said propeller having an extended supporting part, means rotatably receiving said part, a valve movable on said extended supporting part to close said conduit outlet, said valve being opened by a predetermined pressure of the material thereon during operation of the propeller, means for automatically closing the valve upon discontinuing operation of the propeller, means for operating the propeller, and means for moving the material within the container.

19. An apparatus for treating food compounds, comprising an elongated container having inlet and outlet openings for the material adjacent one end thereof, means mounted exteriorly of the container for combining, mixing, and feeding the ingredients of the material to the inlet of the container in predetermined proportions, a valve for controlling said inlet opened by a predetermined pressure of the material thereon, pressure means for automatically closing the valve upon a reduction in the pressure of the material thereon below the pressure required to open the valve, means within the container for moving the material from its inlet end to its opposite end and back to said inlet end for discharge through said outlet opening, and means for heating the material while moving it within the container.

WILLIAM A. SMITH.